United States Patent [19]

Förster

[11] 4,444,126

[45] Apr. 24, 1984

[54] APPARATUS FOR COMBUSTION OF A SUSPENSION OF COAL PARTICLES IN WATER

[75] Inventor: Seigfried Förster, Alsdorf, Fed. Rep. of Germany

[73] Assignee: Kernforschungsanlage Jülich Gesellschaft mit beschränkter Haftung, Jülich, Fed. Rep. of Germany

[21] Appl. No.: 382,927

[22] Filed: May 28, 1982

Related U.S. Application Data

[63] Continuation of Ser. No. 253,163, Apr. 10, 1981, abandoned.

[30] Foreign Application Priority Data

Apr. 14, 1980 [DE] Fed. Rep. of Germany ....... 3014242

[51] Int. Cl.³ ............................................. F23G 7/00
[52] U.S. Cl. ...................................... 110/238; 431/9; 110/263; 110/261
[58] Field of Search .............. 110/238, 347, 261, 262, 110/263, 348; 431/9, 108, 195

[56] References Cited

U.S. PATENT DOCUMENTS

| | | | |
|---|---|---|---|
| 3,516,777 | 6/1970 | Hines et al. .......................... | 110/238 |
| 3,583,339 | 6/1971 | Kube .................................... | 110/238 |
| 3,589,314 | 6/1971 | Tratz .................................... | 110/263 |
| 3,610,178 | 10/1971 | Hines .................................. | 110/238 |
| 3,611,954 | 10/1971 | Monroe, Jr. ......................... | 110/238 |
| 3,682,114 | 8/1972 | Scheubel ............................. | 110/263 |
| 3,734,035 | 5/1973 | Whitfield ............................. | 110/238 |
| 3,748,081 | 7/1973 | Hummell ............................. | 110/238 |
| 4,094,625 | 6/1978 | Wang et al. ............................ | 431/9 |
| 4,206,712 | 6/1980 | Vatsky ................................. | 110/261 |
| 4,265,302 | 5/1981 | Förster et al. ....................... | 165/165 |
| 4,321,964 | 3/1982 | Förster ................................ | 165/165 |

Primary Examiner—Henry C. Yuen
Attorney, Agent, or Firm—Frishauf, Holtz, Goodman & Woodward

[57] ABSTRACT

Combustion air preheated to 550° C. is forced into a suspension of powdered coal in water preheated to 100° C. in a portion of a burner upstream of the burner orifice. Air passes into the preheated suspension through a porous wall separating the end portion of the air duct from the suspension duct, and its heat content is sufficient to vaporize the water of the suspension, while the amount of air flow is such as to provide approximately stoichiometric proportions of coal and air. Preheating is done by recuperators, through which the combustion product gases from the furnace flow before being discharged at a temperature low enough for evaporating condensed water.

3 Claims, 5 Drawing Figures

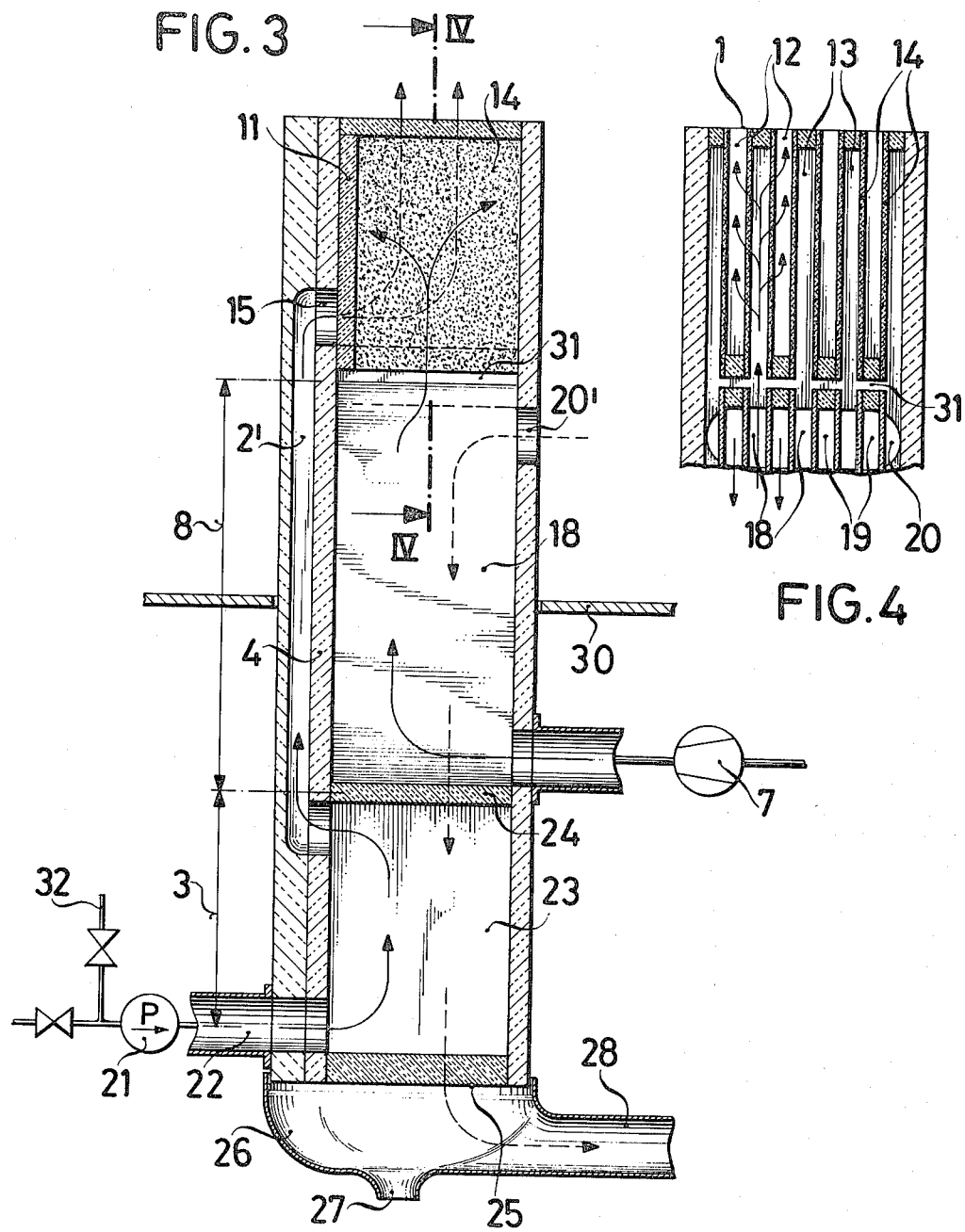

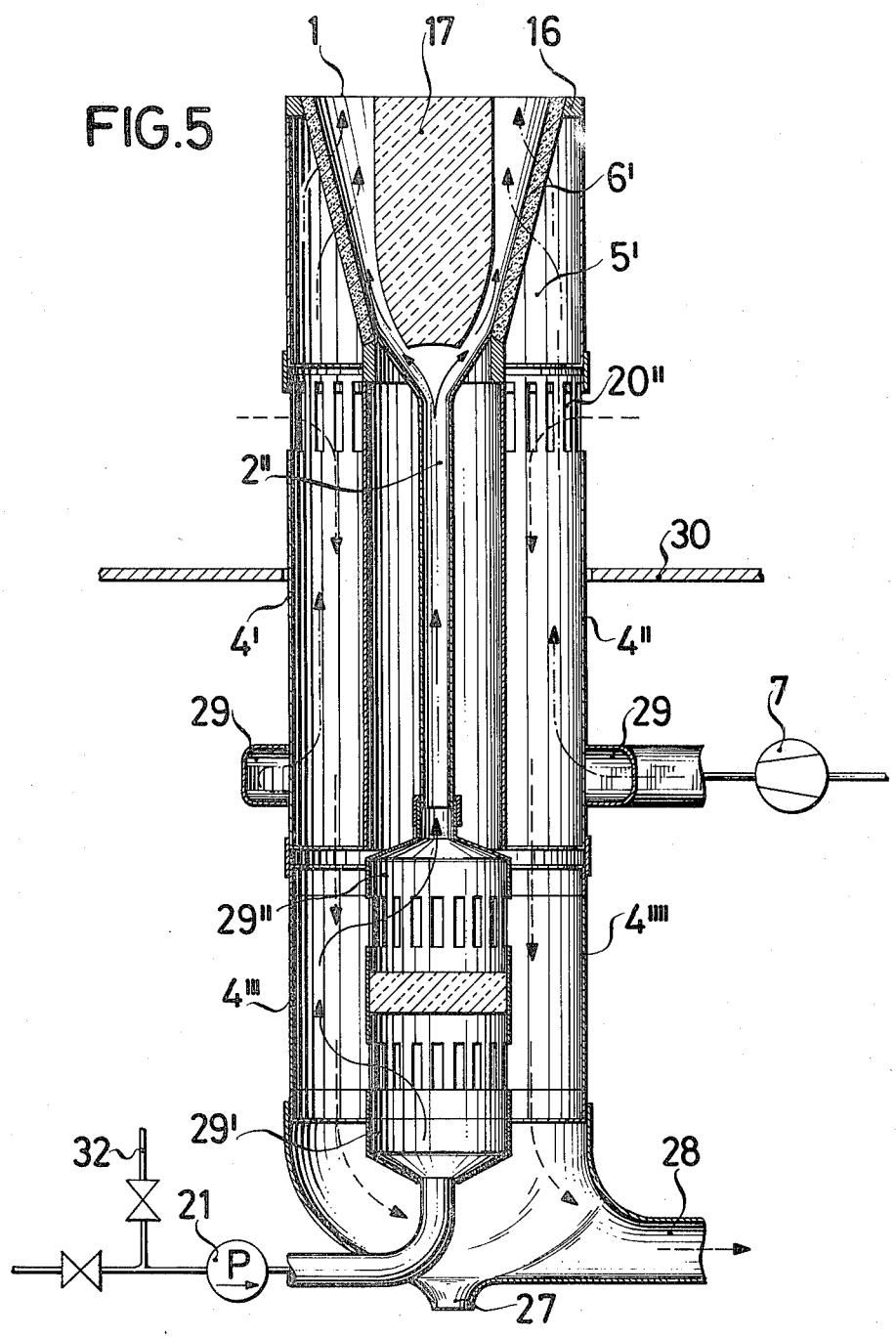

APPARATUS FOR COMBUSTION OF A SUSPENSION OF COAL PARTICLES IN WATER

This a continuation, of application Serial Number 253,163 filed April 10, 1981, now abandoned.

The invention concerns a method and equipment for burning a preheated suspension of coal particles in water.

In order to transport coal and to handle it in the combustion process with conveniences and advantages similar to those of liquid or gaseous fuel, it is known to feed powdered coal with water in pipelines to the location where heat is to be generated and, after a drying process, to burn it. The pipeline transportation followed by drying of the coal has not, however, proved to be sufficiently economical for general use.

It has therefore been sought to provide direct combustion of a coal/water suspension. Compare in this connection Hagemann et al., "Herstellung, Transport und Verbrennung von Kohle/Wasser-Suspension im Kraftwerk", published in the periodical "Glückauf", 1973, pp. 830 ff. In the case of direct combustion, the composition of the coal/water suspension is of decisive significance and both the supply of the coal and the burning of the coal/water suspension must proceed in an optimal way. The atomizers used for distributing the suspension in the combustion chamber are exposed to a high degree of wear resulting from the passage through them of the coal/water suspension. Rotary atomizers have been preferred in which the atomizing dispensers rotate at speeds of about 6000 rpm. Thermal pressure atomizers have also been installed for such purposes to which the coal/water suspension is supplied under pressure and heated to almost the saturated vapor temperature. This heating of the suspension to a temperature in the region between 150° C. and 200° C. leads to the precipitation of deposits that fall out onto the walls of the heat exchanger and the equipment downstream therefrom and impair the effectiveness of the process. It is known to heat the coal/water suspension in steam heat exchangers. In such processes, however, the water content increases in an undesirable way in the suspension, which leads to heat losses. It is also disadvantageous that substantial residues of the combustible material are not converted and remain in the exhaust gas.

THE INVENTION

It is an object of the invention to provide a process and equipment for the combustion of suspensions of coal in water which, without formation of deposits in heat exchangers or in equipment following the heat exchanger, make it possible to adjust the coal dust/water vapor/air mixture introduced into a combustion chamber in such a way that a stoichiometric combustion takes place.

Briefly, according to the invention, before the suspension reaches the burner mouth, heated combustion air is introduced. The heat quantity in the combustion air is sufficient to vaporize the water in the suspension following its introduction into the suspension. At the same time, the rate of supply of the combustion supporting air is so adjusted that a coal dust/water vapor/air mixture of approximately stoichiometric proportions is formed.

Two objects are obtained by the introduction of heated combustion air into the coal/water suspension: on the one hand, the coal in water suspension is readily transportable to the burner mouth at temperatures which are still not high enough to cause undesired deposits to appear. The vaporization of the water of the suspension which is necessary for the combustion process is produced by the combustion supporting air introduced at a location still upstream of the burner mouth. On the other hand, it is possible, by the introduction of a corresponding amount of preheated combustion air, at the same time, to influence the combustion process in the combustion chamber in such a way that an approximately complete combustion takes place and no unburned components or at least only a negligible small content thereof are drawn out with the discharged gas.

For carrying out the process, it is particularly effective to provide in the burner structure a combustion air channel that feeds into the conduit of the suspension upstream of the burner, for the heated air. The flow space of the coal/water feed is separated from the combustion air channel at their junction by a porous partition that allows the combustion air to pass through. In order to blow the combustion air into the coal/water suspension, the pressure in the combustion air channel is controlled, as by a controllable blower, in a manner dependent upon the rate of feed of the suspension in its duct, so that at the burner mouth an ignitable and stoichiometrically combustible coal dust/water vapor/air mixture flows out of the burner mouth.

In order to take account of the considerable expansion of the coal dust/water vapor/air mixture produced in the feed channel of the burner upon introduction of the combustion air, it is advantageous for the cross section of the duct for the suspension to be widened in the direction of flow, from the place of introduction of the air downstream.

Preferably, both the feed duct for the coal/water suspension and also the combustion air channel are connected to a heat recuperator which heats the passages through which these media are supplied to the burner mouth by heat exchange with the exhaust gases streaming out of the combustion chamber.

THE DRAWING

The invention is further described by way of illustrative example with reference to the annexed drawing, in which:

FIG. 3 is a schematic lengthwise section through a burner for coal/water suspension equipped with slot-shaped flow channels leading to the burner mouth for the coal dust/water vapor/air mixture;

FIG. 4 is a lengthwise section through a burner head of the kind shown in FIG. 3 along the section line IV-IV of FIG. 3, and FIG. 5 is a lengthwise section through a burner for coal/water suspension having a funnel-shaped open burner head.

DESCRIPTION OF THE ILLUSTRATED EMBODIMENTS

Figure 1:
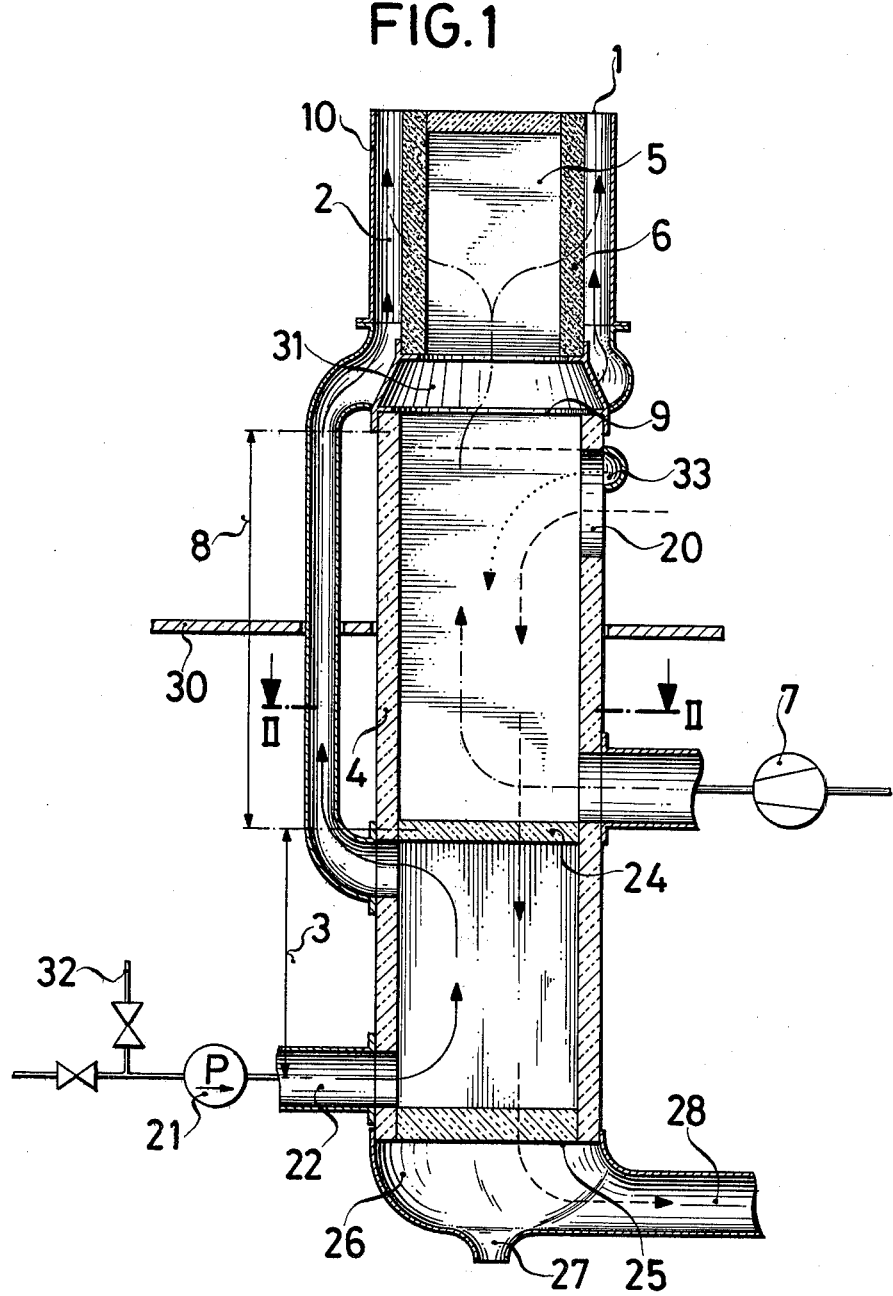
FIG. 1 is a lengthwise schematic section through a burner for coal/water suspension, having a cylinder-shaped burner head.

The schematically represented burners for coal/water suspension in the drawing show in each case a supply conduit 2 for the coal/water suspension leading to the burner mouth 1, connected to a heat exchange zone 3 of a recuperator 4. In the heat exchange zone, the coal/water suspension is heated about to the vaporization temperature of the water. In the illustrated example, the coal/water suspension is heated up to a temperature of 100° C.

Ahead of the burner mouth 1, a combustion air channel 5 discharges into the conduit 2. At the place of junction, porous wall portions 6 are installed through which the combustion air can pass. The combustion air in the channel 5 is under pressure from a blower 7 that is located ahead of a heat exchange zone 8 of the recuperator 4 that heats the combustion air. The exit temperature of the combustion air at the combustion air exit 9 of the recuperator 4 is so determined that the heat content of the combustion air that is introduced through the porous wall sections 6, for the provision of an ignitable stoichiometric coal dust/water vapor/air mixture, is sufficient in order to vaporize fully the water contained in the coal/water suspension. For a temperature of the coal/water suspension in the conduit 2 of 100° C., the combustion air flowing into the conduit 2 needs to be heated to about 550° C.

In the illustrative examples, the flow cross-section of the conduit 2 at the burner mouth 1 is so dimensioned that the coal dust/water vapor/air mixture can freely be blown into the combustion chamber. Supplementary nozzle plates at the burner mouth 1, which would wear away fast, are not required. The conduit 2 and the wall portions 6 are made of ceramic materials. They can, however, also be made of metals that have wear-resistant surfaces, or by use of both kinds of materials, thus from both ceramic and metallic components. In the embodiment of FIG. 1, a cylindrically shaped burner head 10 is provided, equipped with the feed duct 2 and the combustion air passage 5. At the burner mouth 1, feed duct 2 has an annular discharge cross section.

FIG. 3 shows a burner head 11 with slot-shaped flow channels 12 for the coal dust/water vapor/air mixture. As can be seen from the lengthwise section of the burner head 11 given in FIG. 4, the burner head 11 has a multiplicity of flow channels 12, between which slot-shaped flow channels 13 for the combustion air are arranged. Flow channels 12 and flow channels 13 run parallel to each other in the burner head 11. Partitions 14 between the flow channels consist of porous material through which the combustion air can pass. The flow channels 13 are closed at the burner mouth 1, so that the combustion air pressed into the flow channels 13 by the blower 7 penetrate through the porous partitions 14 into the flowing coal/water suspension flowing in the flow channels 12. The flow channels 13 for the combustion air are open at the end of the burner head opposite the burner mouth 1 and here they are connected to the combustion air heating recuperator 4. The flow channel 12 for the coal/water suspension have lateral openings at the connection 15 to the duct 2.

In the embodiment shown in FIG. 5, a burner head 16 is constituted as a funnel open towards the burner mouth 1. The wall portions 6 of the funnel consist of porous material that permits the passage of the combustion air. A core piece 17 set in the middle of the funnel-shaped burner heads 16 is of such a shape that the duct 2, that guides the expanding coal dust/water vapor/air mixture to the burner mouth 1, has an increasing flow cross-section as seen in the direction of flow. This constitution of the feed duct 2 takes account of the strong expansion of the coal dust/water vapor/air mixture as the result of the vaporizing water upon introduction of the combustion air into the duct 2. In order to introduce the combustion air evenly over the length of the partition 6 into the duct 2, the flow cross-section of the combustion air channels 5 tapers down in a manner corresponding to the combustion air, quantities escaping into the duct 2.

Figure 2:
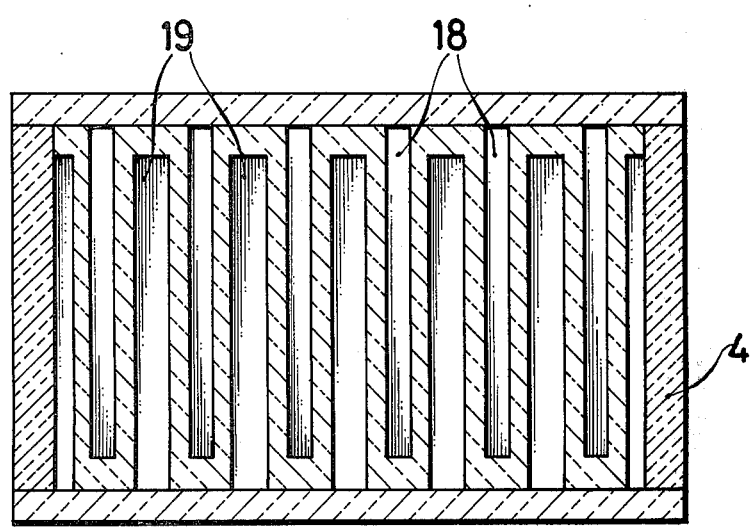
FIG. 2 is a schematic transverse section of the burner of FIG. 1 passing through the section line II-II of FIG. 1.

The recuperators used in the illustrated embodiments are of the same construction in all cases. These are recuperators such as are known from German patent No. 27 07 290 or published German application OS No. 27 39 807. The recuperators have a multiplicity of flow channels oriented parallel to each other having slot-shaped flow cross-sections and disposed adjacent to each other along their extensive sides, as is evident from the cross-section shown in FIG. 2. In the illustrated case, the combustion air flows in the flow channels 18 of the recuperator 4, while the exhaust gas flows in countercurrent to the combustion air in the flow channels 19. The exhaust gas enters into the recuperator 4 of FIG. 1, 4' of FIG. 3 or 4'' of FIG. 5 laterally at the exhaust gas inlet 20 of FIG. 1, the inlet 20' of FIG. 3 and the inlet 20'' of FIG. 5, respectively (compare FIGS. 3 and 4). The exhaust gas flows both through the heat exchange zone 8 in which the combustion air is heated and also through the heat exchange zone 3 of the recuperator 4, that serves for the heating of the coal/water suspension. The coal/water suspension is fed by a feed pump 21, in the illustrated example a membrane pump with a metallic membrane, through the pipe 22 into the flow channels of the heat exchanger zone 3, which are disposed flush with the flow channels 18 for the combustion air. Between the flow channels 23 and the flow channels 18 are inserted partitions 24 separating the heat exchanger zones 3 and 8. In the heat exchange zone 3, the exhaust gas is cooled down to the dew point temperature of the exhaust gas. At the discharge exit 25 of the exhaust gas at the end of the recuperator 4, there is accordingly provided a catch basin 26 having a condensate drain 27. A discharge gas line serves for carrying away the exhaust gas.

In the embodiment according to FIG. 5, a number of recuperators 4' to $4^{iv}$ are installed in the burners. In this case, both the recuperators 4''', $4^{iv}$ forming the heat exchange zone 3 and also the recuperators 4',4'' forming the heat exchange zone 8 are connected in parallel. The construction of the recuperators 4' to $4^{iv}$ corresponds to the construction of the previously described recuperators 4. Instead of the recuperators 4',4'' or 4''', $4^{iv}$ can also be provided as cylindrical recuperators or a single cylindrical recuperator can be provided as is known from DE/OS No. 27 39 807. For supply and removal of the media in heat exchange relationship there are provided in the embodiment of FIG. 5 the manifolds 29,29',29'' connecting the recuperators arranged in parallel. The feed duct 2 for the preheated coal/water suspension is fed centrally in the burner.

In the illustrated embodiments, the burners protrude through combustion chamber wall 30 into a combustion chamber not specifically designated in the figures of the drawing. The exhaust inlet 20 of the recuperators is located inside the combustion chamber. The exhaust gas can thus flow into the recuperators 4 after giving up heat in the boiler or furnace space.

The combustion air channels 5 of the burner heads 10 and 11 of the embodiments according to FIGS. 1 and 3 are disposed in each case at a spacing from the combustion air exit 9 of the recuperator 4. The intermediate space 31 thus produced between the recuperator 4 and the combustion air channels 5 of the burner heads serves for collecting the gas, so that particularly in the case of the burner head 11 a uniform distribution of the combustion air among the individual flow channels of the recuperator is obtained.

For cleaning the components of the burner that guide the coal/water suspension, these components are flushed in place at intervals following periods of use. For this purpose, the feed pump 21 that normally feeds the suspension can be connected to a water supply pipe 32. In the example illustrated in FIG. 1, cleaning is provided also for the flow channels of the recuperator that serve the exhaust gases. For this purpose, a flushing pipe 33 is connected to the exhaust gas input of the recuperator 4, by which flushing water can be introduced into the exhaust gas channels (see FIG. 1).

For cold starting of the burner, the coal/water suspension and the combustion air can be heated to the necessary temperature for formation of an ignitable mixture by means of electric heating. This electric heating is not shown in the drawing. It is necessary only for the start-up of the process. As soon as the exhaust gas flowing into the recuperators, after the ignition of the coal dust/water vapor/air mixture, has reached a temperature sufficient for heating up of the feed suspension and the combustion air, the electrical heating is turned off again.

Although the invention has been described with reference to particular illustrative embodiments, it will be understood that variations and modifications are possible within the inventive concept.

I claim:

1. A burner for the combustion of a suspension of coal particles in water, comprising:
   means for preheating the suspension to a first temperature range;
   first duct means for feeding said preheated suspension to a burner orifice;
   a porous wall structure provided in the end portion of said first duct means near said orifice for introduction of hot air therethrough from an adjacent air duct and constituting a porous partition between said first duct means and said adjacent air duct;
   means for preheating combustion supporting air to a second temperature range much higher than said first temperature range;
   second duct means for leading said preheated air to said air duct adjoining said first duct means,
   said air duct being closed off so that it has no exit other than said porous partition constituted by said porous wall structure, for permitting a pressure to be built up for causing said preheated air to flow into said suspension upstream of said orifice for substantial vaporization of the water of said suspension and admixture before the thus aerated suspension reaches said orifice.

2. A burner as defined in claim 1, in which said first duct means (2) for said suspension, at least in said end portion in which air is introduced into said suspension through said porous wall structure, is constituted with a cross-sectional area that increases in the downstream direction towards said orifice.

3. A burner as defined in claim 1 or claim 2, in which said preheating means comprise heat recuperating means through which combustion gases from said burner are caused to flow, prior to discharge, and are thereby caused to preheat, successively, said combustion supporting air and said coal-in-water suspension.

* * * * *

UNITED STATES PATENT AND TRADEMARK OFFICE
CERTIFICATE OF CORRECTION

PATENT NO.   :   4,444,126
DATED        :   April 24, 1984
INVENTOR(S)  :   Siegfried Förster It is certified that error appears in the above-identified patent and that said Letters Patent is hereby corrected as shown below:

On the title page,
The correct spelling of the inventors first name is:

SIEGFRIED

Signed and Sealed this

Twenty-sixth Day of March 1985

[SEAL]

*Attest:*

DONALD J. QUIGG

*Attesting Officer*      Acting Commissioner of Patents and Trademarks